April 21, 1942. H. J. STEIN 2,280,671
METHOD OF MAKING TEMPERATURE STABILIZED SHAFTS
Filed May 22, 1940  2 Sheets-Sheet 1

Inventor
H. J. Stein
by
Attorney

April 21, 1942.  H. J. STEIN  2,280,671
METHOD OF MAKING TEMPERATURE STABILIZED SHAFTS
Filed May 22, 1940  2 Sheets-Sheet 2
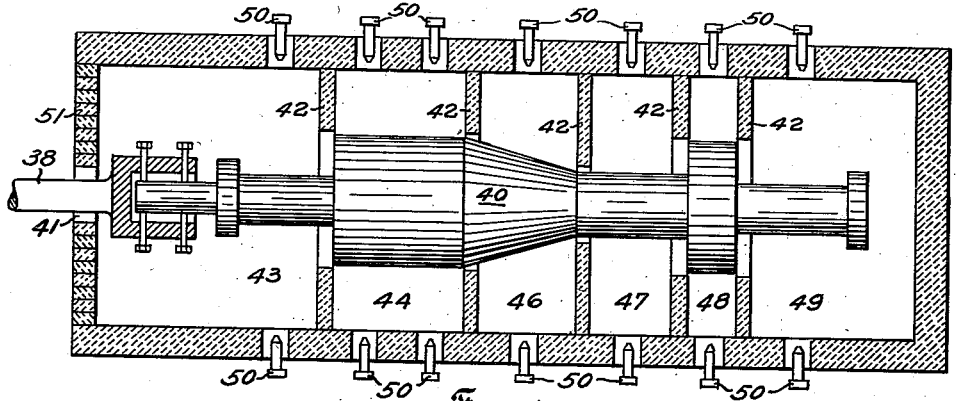
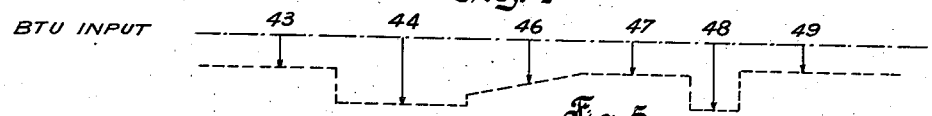
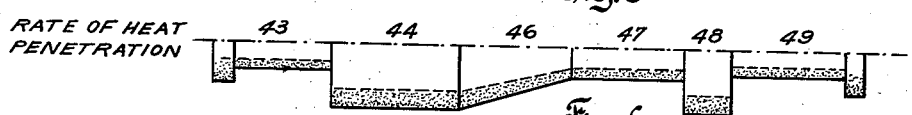
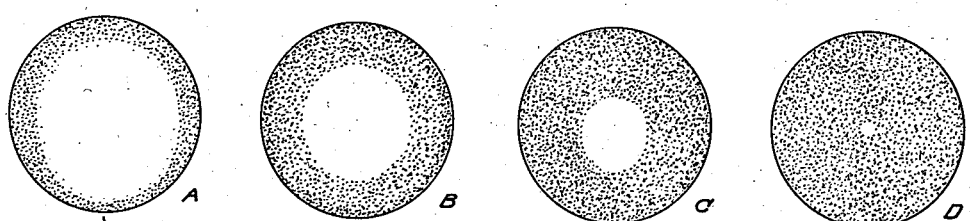
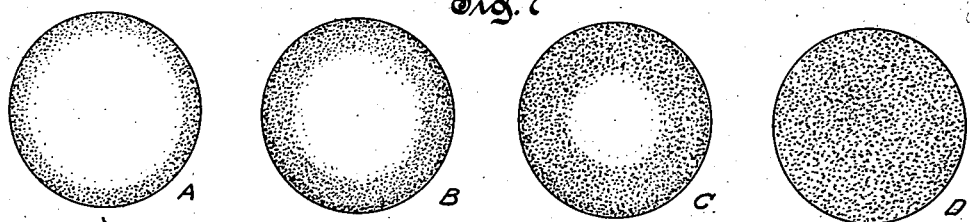
Inventor
H. J. Stein
by
Attorney

UNITED STATES PATENT OFFICE 2,280,671

METHOD OF MAKING TEMPERATURE STABILIZED SHAFTS

Harold J. Stein, Wauwatosa, Wis., assignor to Allis-Chalmers Manufacturing Company, Milwaukee, Wis., a corporation of Delaware Application May 22, 1940, Serial No. 336,502

4 Claims. (Cl. 148—12)

This invention relates generally to rotary shafting and more particularly to large shafting such as ship propeller shafts, turbine spindles, generator rotors and the like.

It is a known fact that some large high speed shafts have a tendency to vibrate excessively and that the excessive vibration most frequently occurs with shafts which become heated to an appreciable degree during normal operation and particularly with respect to shafts in which different portions of the shaft attain widely varying degrees of temperature. It is also a known fact that although massive shafts are true when cold they can and do deflect when heated and that in actual service such shafts do deflect and assume a sufficient bow-like form between the supporting bearings to effect an eccentricity of mass capable of exerting a sidewise thrust on the bearings amounting to thousands of pounds. These facts are known by turbine manufacturers and it has long been the prevailing practice to subject all turbine shafts to a deflection acceptance test and to reject all shafts which deflect more than a predetermined amount when heated to a specified temperature.

This procedure has failed to eliminate the excessive vibration above mentioned and it is now known that this excessive vibration, which is most frequently experienced in turbine spindles because of the wide variation in operating temperatures with respect to different portions of the spindle, is due, in most instances, to the fact that the axis of the shaft does not coincide with the center of chemical segregation of the mass forming the shaft, i. e., the physical properties of the mass forming the shaft are not symmetrical with respect to the axis about which the shaft rotates, and that as a result the shaft expands to a greater degree on one side than on the other. Consequently, unless the physical properties of the shaft are symmetrical with respect to its axis of rotation, the heating of the entire shaft or a portion thereof to a material degree effects an eccentricity of the mass entirely separate and independent from that produced by the contemplated normal deflection and the result is a rough running machine in which rotor vibration may exceed the permissible limits.

A procedure heretofore proposed for constructing a shaft having symmetrical physical properties with respect to its axis of rotation is to so forge a shaft from an ingot that the axis of the ingot and shaft are in substantial coincidence, annealing the roughly formed shaft to remove internal strains, machining the shaft to its final dimensions using for centers the center of chemical segregation of the shaft ends, and heating the active portions of the finished shaft, while slowly revolving the shaft, to a temperature approximately equal to the highest temperature to be experienced in actual service to eliminate the surface strains produced as an incident to the finishing operations. This procedure necessitates cutting off both ends of the forged shaft either before or after the making of the deflection acceptance test previously mentioned, taking sulphur prints of the newly exposed ends to determine the center of chemical segregation, and recentering the shaft so that the newly formed centers coincide with the center of chemical segregation as determined by the said prints. These newly formed centers are then used for all subsequent finishing and heat treating operations.

The foregoing procedure materially increases manufacturing costs as in many instances there is a sufficient lack of coincidence between the centers used for the rough turning operations and the center of chemical segregation as determined by taking sulphur prints to require an additional rough turning operation. Moreover, in some instances an additional rough turning operation sufficient to effect the desired degree of coincidence will reduce the diameter of the shaft to a value less than the permissible minimum. Furthermore, although the taking of sulphur prints does indicate the center of chemical segregation at the ends of the shaft at which the prints are taken, there is no assurance that the degree of segregation is uniform throughout the length of the shaft and that the recentering of the shaft using such prints as a guide will effect the desired degree of coincidence throughout the length of the shaft between the axis of the shaft and the center of chemical segregation of the mass forming the shaft. In other words, this procedure, which merely indicates whether the physical properties of the mass forming the shaft are symmetrical with respect to the axis of the shaft at the ends thereof, fails to indicate whether the physical properties are uniformly symmetrical or non-symmetrical with respect to the axis of the shaft throughout that portion of the shaft intermediate the ends thereof and fails to disclose a procedure inherently operable to symmetrize the physical properties of the mass forming the shaft with respect to its axis of rotation.

This invention in contradistinction to the above outlined known procedure, which is more fully set forth in the United States patent to S. H. Weaver, No. 1,734,930, contemplates a procedure for making temperature stabilized shafts which inherently symmetrizes the physical properties of the mass forming a shaft with respect to its axis of rotation. This symmetrizing procedure comprises the steps of (1) heating a generally cylindrical ingot to a uniform forging temperature and so as to concenter heat penetration with respect to the longitudinal axis of the ingot, (2) forging the thus heated ingot to the approximate shaft shape and so as to effect a symmetrical disposition of the material about the axis of the ingot, (3) rough machining the forged shaft to approximate size using centers coincident with the axis of the ingot, (4) annealing the rough machined shaft by heating the shaft so as to concenter heat penetration with respect to the axis of the shaft, (5) finishing said shaft using said coincident centers, and (6) stress relieving said finished shaft while revolving the shaft about the said coincident axis.

Step 1 is of particular importance with respect to the heating of large ingots to a uniform forging temperature as the concentered heating of the ingot eliminates the unequal expansion and the unequal grain growth inherently produced by the known heating arrangements in which the portion of the ingot to be first heated to the desired temperature, which is usually the upper coaxial portion, is retained at this temperature for a considerably longer time than the last heated or bottom coaxial portion of the ingot. Unequal expansion produces physical stresses which may be eliminated by forging and subsequent heat treating operations, but unequal grain growth produces thermal stresses and non-symmetrical properties with respect to the longitudinal axis of the ingot which can rarely, if ever, be eliminated by forging and the subsequent heat treating operations. Step 4 is of particular importance with respect to all sizes and shapes of shafts as the concentered heating of the rough machined shaft to the desired annealing temperature likewise eliminates the injurious effects attributable to the unequal expansion and to the unequal grain growth inherently produced by the known types of annealing apparatus in the same manner as pointed out in connection with the known procedure of heating ingots. The remaining steps, namely, steps 2, 3, 5 and 6, are common practice in the art and should be employed in connection with steps 1 and 4 in order to obtain the best results.

It is therefore an object of this invention to provide an improved method of producing temperature stabilized shafts.

Another object of this invention is to provide an improved method of symmetrizing the physical properties of the mass forming the shaft with respect to its axis of rotation.

Another object of this invention is to provide an improved method of heating ingots which concenters heat penetration with respect to the longitudinal axis of the ingot.

Still another object of this invention is to provide an improved method of annealing shafts which concenters heat penetration with respect to the axis about which the shaft rotates.

A further object of this invention is to provide an improved method of annealing shafts having portions of different diameter which concenters heat penetration with respect to the axis about which the shaft rotates and which produces physical properties in each portion having similar characteristics with respect to the nature, size and arrangement of the grain structure.

The invention accordingly consists of the various methods and processes as more fully set forth in the appended claims and in the detailed description in which:

Fig. 4 is a sectional plan view of a modified annealing apparatus;

Figures 1, 2, 3:
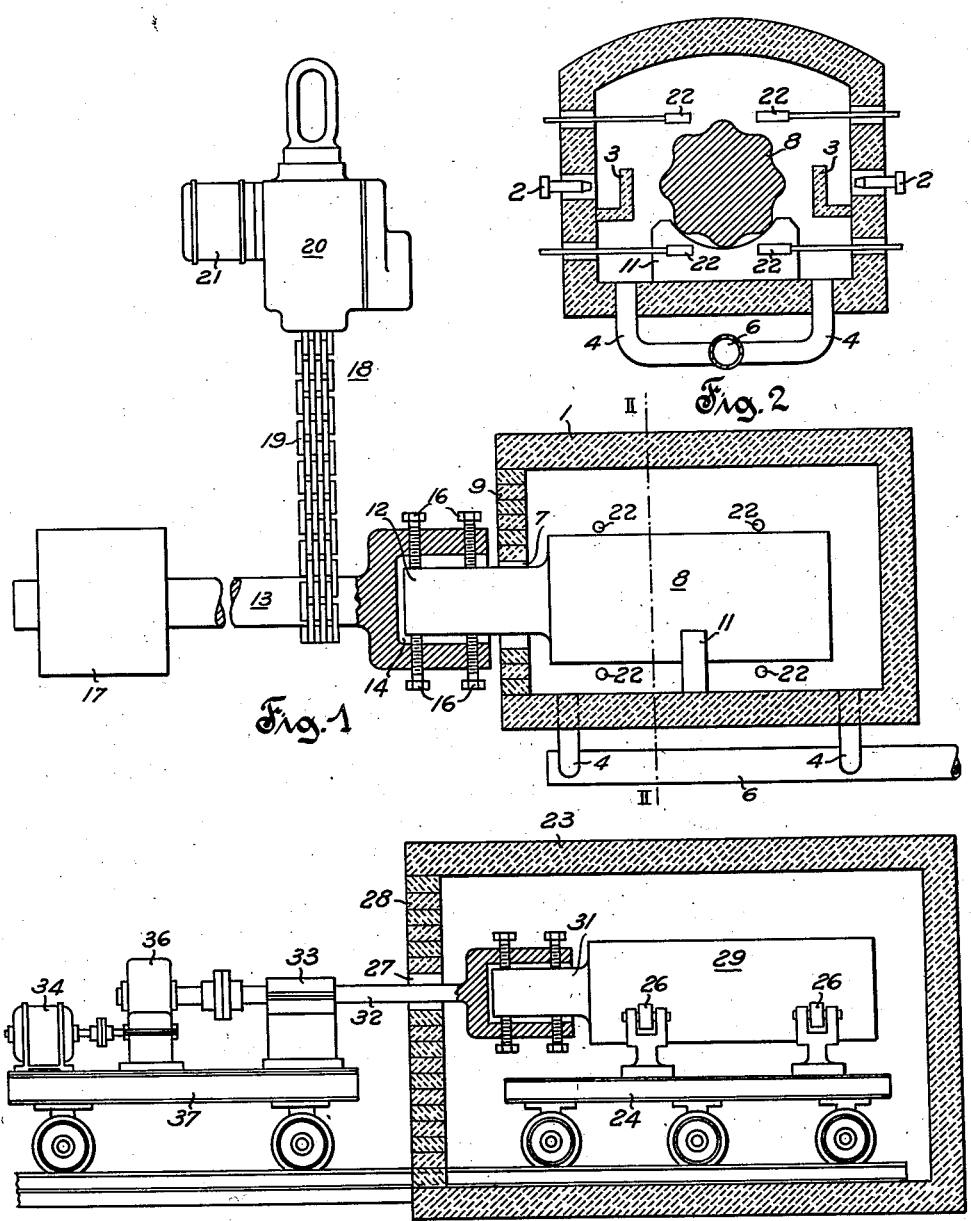
Fig. 1 is a side view, partly in section, of an ingot heating apparatus embodying the invention.
Fig. 2 is a vertical sectional view taken on line II—II of Fig. 1.
Fig. 3 is a side view, partly in section, of an annealing apparatus embodying the invention.

Fig. 5 graphically illustrates with respect to the apparatus shown in Fig. 4 the relative B. t. u. input to the heating zones including shaft portions of different diameter;

Fig. 6 graphically illustrates the relative rate of heat penetration into the shaft portions of different diameter effected by the apparatus shown in Fig. 4;

Fig. 7 illustrates one method which approximately concenters heat penetration with respect to the longitudinal axis of a shaft or ingot; and Fig. 8 illustrates another method which uniformly concenters heat penetration with respect to the longitudinal axis of a shaft or ingot.

Referring to Figs. 1 and 2 of the drawings it is seen that the ingot heating apparatus comprises a furnace 1 having in each side wall thereof a plurality of longitudinally spaced burners 2, a plurality of downward extending discharge flues 4 which connect with a common discharge flue or manifold 6 which in turn may be connected with a stack (not shown), an opening 7 in one end through which an ingot 8 may be inserted and which is usually substantially closed after the ingot has been inserted by means of the temporary brick work 9, and one or more structures 11 for supporting the ingot 8. In order to facilitate the insertion and removal of the ingot from the furnace, the outer end of the ingot is usually provided with a coaxially extending stub portion 12 to which is removably secured a porter bar 13 by means of the recess or socket 14 in the adjacent end of the porter bar into which socket the stub portion 12 extends and the coacting retaining pins or bolts 16. The opposite end of the porter bar 13 is provided with a counterweight 17 and the usual practice is to support the porter bar and the adjacent portion of the ingot by a means exterior of the furnace, such for example as a crane held sling arrangement 18 (the crane has been omitted in the interests of simplicity) which passes around an intermediate portion of the porter bar. The counterweight 17 enables the ingot and porter bar to be readily balanced as a unit on the crane held sling by the application of only a small force to the counterweighted end of the porter bar.

In accordance with this invention, the crane held sling arrangement 18 comprises an endless web type chain 19 which passes around an intermediate portion of the porter bar 13 and a turning mechanism 20 which includes a motor 21 operable to cause the chain 19 to run over a suitable sprocket wheel (not shown). When the porter bar and a generally cylindrical ingot are balanced so as to be supported as a unit on the chain 19, the operation of the turning mechanism and the resultant movement of the chain 19 will rotate or turn the porter bar and ingot as a unit about an axis coincident with the axis of the ingot. This feature is of particularly importance in connection with the heating of large ingots to a uniform forging temperature as it provides a means for concentering heat penetration with respect to the axis of the ingot which in turn symmetrizes the physical properties of the ingot with respect to the said axis.

Large ingots require a long period of heating, which may be as much as forty hours or more depending upon the diameter of the ingot, in order to heat the ingot to a uniform and desired forging temperature, and prior to this invention it was not appreciated that the temperature in the most modern ingot heating furnaces or chambers is not sufficiently uniform circumferentially of the ingot to even approximately concenter heat penetration with respect to the axis of the ingot. Neither was it appreciated that lack of concentered heat penetration results in the ingot having at least one portion of a concentric zone of substantial radial thickness (generally the top coaxial portion) which is maintained at the desired forging temperature for a considerably longer time than some other portion of said zone (generally the coaxial bottom portion), that as a result grain growth, which is a function of time and temperature, will consequently be greater in said one portion than in said some other portion, that unequal grain growth in different portions of a concentric zone of the ingot results in the ingot having non-symmetrical physical properties with respect to its longitudinal axis, and that the forging and subsequent annealing and heat treating operations to which the ingot and shaft are usually subjected will not correct the lack of symmetry attributable to the unequal grain growth previously mentioned.

Referring to Fig. 7, view A, which illustrates with respect to the axis of a generally cylindrical ingot the lack of concentered heat penetration inherently produced in the known forms of ingot heating furnaces or chambers, it is seen that the rate of heat penetration is considerably greater in the top coaxial portion of the ingot than it is in the bottom coaxial portion thereof, that the entire top coaxial portion of the ingot will become uniformly heated to the desired forging temperature long before the entire coaxial bottom portion thereof, and that as a result the physical properties of the ingot will not be symmetrical with respect to its longitudinal axis. This lack of symmetry of the physical properties can be entirely avoided by employing an ingot turning mechanism, such for example as that shown in Fig. 1, and turning or revolving the ingot about its longitudinal axis during the heating period. The best results are obtained by a continuous slow rotation of the ingot during the entire heating period as is indicated by Fig. 8, views A, B, C and D, which illustrate the relative degree of concentered heat penetration effected by this procedure. Substantially the same result can be obtained by effecting a step by step or partial rotation of the ingot at regular intervals. For example, if the ingot heating furnace effects a penetration of heat into the ingot in a manner similar to that illustrated in view A of Fig. 7, the ingot should be periodically turned or rotated about its longitudinal axis through an angle of one hundred eighty degrees so as to concenter the heat penetration with respect to said axis as illustrated by views B, C and D of Fig. 7.

The extent and the frequency of the partial rotations in order to obtain satisfactory results in this connection depends on the uniformity of the temperature within the furnace and the diameter of the ingot. Generally speaking, the greater the variation in temperature circumferentially of the ingot and the larger the diameter of the ingot, the more often the ingot should be turned. The extent of the partial rotation which is necessary in order to concenter heat penetration with respect to the longitudinal axis of the ingot can be readily determined by measuring the temperature of successive axial portions of the zone surrounding the ingot by taking temperature readings at circumferentially spaced points, preferably at least four, in each of said zone portions as indicated by the thermocouples 22 in Figs. 1 and 2. The number of such portions in which temperature readings should be taken will of course depend on the length of the ingot, but satisfactory results will be obtained if the readings are taken in portions corresponding in number and location to the longitudinal spacing of the burners. These readings indicate the manner in which the temperature varies circumferentially of the ingot in each of said zone portions and since the manner of variation in each of the said zone portions is usually quite similar or can be made similar by regulating the burners, these readings also indicate the degree of turning movement necessary in order to approximately concenter heat penetration in the manner illustrated by views B, C and D of Fig. 7. If the frequency of turning is such that the ingot is partially rotated, say every fifteen or twenty minutes, heat penetration will be concentered in substantially the same manner as indicated by views A, B, C and D of Fig. 8. However, it will be found that in the better types of ingot heating furnaces the variation in temperature circumferentially of the ingot is not sufficient to necessitate a frequent partial rotation or turning of the ingot and that in some instances as few as two or three partial rotations will suffice. For example, in heating a forty-eight inch diameter octagon type (generally circular) ingot weighing 91,270 pounds (see Fig. 2) in a furnace having a variation in temperature circumferentially of the ingot operative to effect a penetration of heat in the manner shown in view A of Fig. 7, the physical properties of the ingot were symmetrized by turning the ingot through an angle with respect to its longitudinal axis of 180° five times during the heating period.

Referring to Fig. 3, it is seen that the annealing apparatus comprises a furnace 23 having a plurality of heating burners (not shown), the arrangement of which may be similar to that shown in Fig. 1, a shaft supporting wheeled truck 24 on which is mounted a plurality of pairs of shaft supporting rollers 26, and an open end 27 which is substantially closed by the temporary brick work 28 after the rough machined shaft 29 has been placed in the furnace. The shaft 29, which is preferably mounted on the truck 24 exteriorly of the furnace, is provided with a coaxially extending stub portion 31 to which is secured a turning mechanism comprising a porter bar 32, a bearing 33, an electric driving motor 34 and a reduction gearing 36 operatively connecting the motor 34 with the porter bar 32 and controlled so as to effect a slow continuous or step by step rotation of the porter bar 32. The shaft 29 is connected with the porter bar 32 for simultaneous rotation therewith in a manner similar to that used in connecting the porter bar 13 with the ingot 8 of Fig. 1. The porter bar 32, the bearing 33, the motor 34 and the gearing 36 are supported as a unit on a truck 37.

The annealing of the shaft 29, which is formed by forging an ingot heated in the manner previously described to approximate shaft shape and so as to obtain a symmetrical disposition of the material with respect to the longitudinal axis of the ingot and by rough machining the forged shaft to approximate size using centers coincident with the axis of the ingot, also requires a long period of heating, and prior to this invention it was neither appreciated that the temperature in the most modern annealing furnaces or chambers is not sufficiently uniform circumferentially of the shaft to even approximately concenter heat penetration with respect to the axis of the shaft nor that the lack of concentered heat penetration during the annealing process was sufficient to render the physical properties of the shaft non-symmetrical with respect to its axis of rotation for the reasons previously pointed out in connection with the heating of ingots to the desired forging temperature. However, it is now known that the usual annealing furnace or chambers does produce shafts having non-symmetrical physical properties with respect to its axis of rotation irrespective of the care used in heating, forging and rough machining the forged shaft, and that this lack of symmetry can be entirely avoided by employing a shaft turning mechanism, such for example as that shown in Fig. 3, and slowly turning or revolving the shaft either continuously or step by step about the centers, which should be coincident with the longitudinal axis of the ingot, during the heating and cooling operations.

As previously pointed out in connection with the heating of ingots to the desired forging temperature, the best results are obtained by effecting a slow continuous rotation of the shaft during the entire annealing operation which results in concentering heat penetration with respect to the axis of the shaft in the manner indicated in views A, B, C and D of Fig. 8. It has been found, however, that with respect to the better types of annealing furnaces commercially satisfactory results will be obtained if the shaft is slowly revolved step by step through angles of approximately ninety degrees every fifteen or twenty minutes during the entire annealing operation. This procedure of revolving the shaft step by step at frequent intervals has been adopted for annealing shafts as it is cheaper than rotating the shaft continuously and as it eliminates the taking of temperature readings and the regulation of the burners which would be necessary in order to increase the time interval the shaft remains at rest as disclosed in connection with the step by step rotation of ingots during the heating period. However, the procedure just mentioned in connection with the heating of ingots is justified since ingots are generally not true bodies of revolution, for example see Fig. 2 which shows the cross sectional configuration of the usual form of ingot, and the continual or frequent step by step rotation of an object of this shape and size presents serious difficulties. Annealed shafts having their physical properties symmetrized with respect to their axis of rotation can be obtained by infrequent partial rotations during the annealing operation if due consideration is given to the variations in temperature circumferentially of the shaft and to the diameter of the shaft as previously pointed out in connection with the heating of ingots in this manner.

Fig. 4 shows a modification of the annealing apparatus of Fig. 3 which is of particular importance in connection with the annealing or heat treatment of large shafts such as turbine spindles having portions of different diameter. The shaft turning mechanism and the means rotatably supporting the shaft in the furnace have been omitted in the interests of simplicity, but it should be understood that the shaft is rotated in the manner previously described during the entire annealing operation by means of the porter bar 38 which in turn may be rotated by any suitable form of turning mechanism, such for example as that shown in Fig. 3. In this modification, after the shaft 40 has been inserted into the annealing furnace 39 through the open end 41, the interior of the furnace is then provided with a plurality of temporary partitions 42 which divide the interior of the furnace into a plurality of zones 43, 44, 46, 47, 48 and 49, each of which is coextensive with a shaft portion of different diameter and each of which depending upon its axial length, is provided with one or more longitudinally spaced burners 50. The open end 41 of the furnace is then substantially closed by the temporary brick work 51. The burners 50 in each of said zones are so regulated that the B. t. u. input into each zone is proportional to the diameter of the included shaft portion as indicated by the ordinates of the graph shown in Fig. 5. This arrangement, assuming that the shaft 40 is turned or revolved as previously indicated, concenters heat penetration with respect to the axis of the shaft in each shaft portion at a uniform rate which in each portion is proportional to its diameter. This manner of concentering heat penetration in shafts having portions of different diameter, which is indicated by the shaded portions of the graph shown in Fig. 6, not only symmetrizes the physical properties of the shaft with respect to its axis of rotation, but it renders the characteristics of the physical properties of each shaft portion similar with respect to the nature, size and arrangement of the grain structure.

Shafts having portions of different diameter in which the characteristics of the physical properties are similar with respect to the nature, size and arrangement of the grain structure and in which the physical properties are symmetrized with respect to its axis of rotation are not only extremely smooth running irrespective of the temperature conditions to which they are subjected, but the stress resistant qualities are greatly improved with respect to shafts having portions of different diameter which have been turned or revolved during the annealing without attempting to vary the rate of heat penetration in accordance with the diameter of the said portions. The best results in this connection are obtained by using baffles, such for example as the baffles 41 shown in Fig. 4, which coact to effect a more uniform rate of heat penetration in each shaft portion included in a zone defined in part by one or more of said baffles, but in most instances greatly improved results can be obtained without the use of baffles if the burner arrangement conforms with the portions of the shaft of different diameter and the burners are properly regulated with respect to heat input and if there is not too much difference in size between the shaft portions of different diameter. In actual practice the baffles are usually dispensed with unless the shaft includes one or more axially spaced portions having a relatively small axial dimension and a relatively large diameter.

The heating of generally cylindrical ingots to a uniform forging temperature in accordance with this invention greatly improves the running characteristics of shafts formed from such ingots even though the subsequent heat treating operations are performed in accordance with the procedure practiced prior to this invention. Likewise, the annealing of shafts in accordance with this invention also greatly improves the running characteristics of shafts regardless of the procedure followed in connection with the heating and forging of the ingot. However, if the ingot from which the shaft is to be made is heated in accordance with this invention and the shaft formed from said ingot is thereafter annealed in accordance with this invention, the result is a completely temperature stabilized shaft and all shafts which have been produced in the manner are extremely smooth running irrespective of the temperature conditions to which the shaft is subjected. In addition, these shafts have extremely uniform and greatly improved stress resistant properties. These improved results are attributable to the fact that the procedure of this invention symmetrizes the physical properties of the shaft with respect to its axis of rotation and to the further fact that the characteristics of the physical properties throughout the length of the shaft are similar with respect to the nature, size and arrangement of the grain structure.

The invention is applicable in connection with the making of shafts, rotors, spindles, etc., and although the disclosed procedure and the apparatus for carrying it out are of particular importance with respect to turbine spindles, it should be understood that the invention is not limited to the exact procedure herein shown and described as numerous modifications within the scope of the appended claims may occur to persons skilled in the art.

It is claimed and desired to secure by Letters Patent:

1. In a method of making a temperature stabilized steel shaft from an ingot, the steps comprising heating a generally cylindrical ingot to the requisite forging temperature, uniformly forging said ingot to approximate shaft shape with the longitudinal axis of the shaft substantially coinciding with the longitudinal axis of the ingot, annealing said shaft by applying heat thereto and, during the application of said heat, relatively rotating said shaft and the heat applying means sufficiently to uniformly concenter heat penetration with respect to its longitudinal axis, and thereafter machining said shaft to its final dimensions using centers coincident with its said longitudinal axis.

2. In a method of making a temperature stabilized steel shaft from an ingot, the steps comprising heating a generally cylindrical ingot to the requisite forging temperature by applying heat thereto and, during the application of said heat, relatively moving said ingot and the heat applying means sufficiently to uniformly concenter heat penetration with respect to the longitudinal axis of the ingot, uniformly forging said ingot to approximate shaft shape with the longitudinal axis of the shaft substantially coinciding with the longitudinal axis of the ingot, annealing said shaft by applying heat thereto and, during the application of said heat, relatively rotating said shaft and the heat applying means sufficiently to uniformly concenter heat penetration with respect to its longitudinal axis, and thereafter machining said shaft to its final dimensions using centers coincident with its said longitudinal axis.

3. In a method of making a temperature stabilized steel shaft from an ingot, the steps comprising heating a generally cylindrical ingot to the requisite forging temperature, uniformly forging said ingot to approximate shaft shape with the longitudinal axis of the shaft substantially coinciding with the longitudinal axis of the ingot, annealing said shaft by applying heat thereto and, during the application of said heat, turning said shaft on centers coincident with its longitudinal axis sufficiently to uniformly concenter heat penetration with respect to its said longitudinal axis, and thereafter machining said shaft to its final dimensions using said coincident centers.

4. In a method of making a temperature stabilized steel shaft from an ingot, the steps comprising heating a generally cylindrical ingot to the requisite forging temperature by applying heat thereto and, during the application of said heat, relatively moving said ingot and the heat applying means sufficiently to uniformly concenter heat penetration with respect to the longitudinal axis of the ingot, uniformly forging said ingot to approximate shaft shape with the longitudinal axis of the shaft substantially coinciding with the longitudinal axis of the ingot, annealing said shaft by applying heat thereto and, during the application of said heat, turning said shaft on centers coincident with its longitudinal axis sufficiently to uniformly concenter heat penetration wtih respect to its said longitudinal axis, and thereafter machining said shaft to its final dimensions using said coincident centers.

HAROLD J. STEIN.